Figure 1:
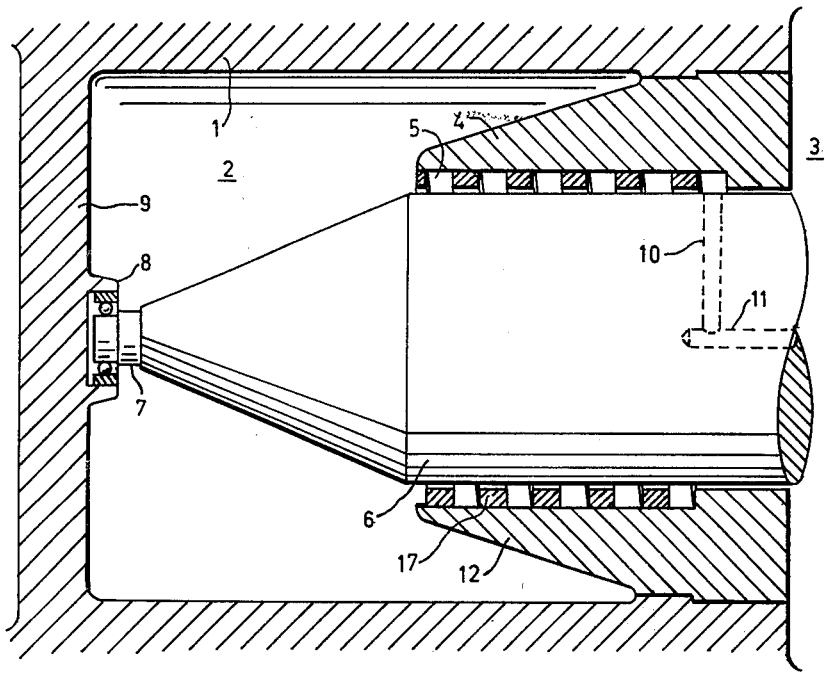

United States Patent [19]
Wijnant et al.

[11] 3,942,803
[45] Mar. 9, 1976

[54] GASTIGHT PASSAGE SEAL

[75] Inventors: Petrus Leo Clemens Wijnant, 's-Hertogenbosch; Hendrik Jan Ijlstra, Weesp, both of Netherlands

[73] Assignee: Reactor Centrum Nederland, The Hague, Netherlands

[22] Filed: June 9, 1972

[21] Appl. No.: 261,397

[30] Foreign Application Priority Data
June 11, 1971 Netherlands ........................ 7108002

[52] U.S. Cl. ................................................. 277/53
[51] Int. Cl. .......................................... F16j 15/44
[58] Field of Search ................... 138/42; 277/53, 56

[56] References Cited
UNITED STATES PATENTS
| | | | |
|---|---|---|---|
| 450,004 | 4/1891 | Daley | 277/53 |
| 1,376,043 | 4/1921 | Sherwood | 415/214 UX |
| 2,487,177 | 11/1949 | Pollock | 415/169 A |
| 2,529,880 | 11/1950 | McClure | 277/53 X |
| 2,966,381 | 12/1960 | Menzel | 415/169 A |

Primary Examiner—Jerry W. Myracle
Attorney, Agent, or Firm—Cushman, Darby & Cushman

[57] ABSTRACT

A gastight seal for fast rotating axes, spindles or other rotors having the form of a body of revolution, of the molecular type, in which helical grooves in the stationary seal part are surrounding the rotor without making contact. Special measures are taken to facilitate the casting of the stationary seal part.

1 Claim, 4 Drawing Figures

GASTIGHT PASSAGE SEAL

The invention relates to a gastight passage for a rapidly rotating solid of revolution incorporated in a housing, which passage is embodied in a wall of this housing, the stationary part of this passage having at least one helical and/or spiral rib which, along with the adjacent wall of the housing or the surface of the solid of revolution, forms the boundary of at least one continuous thread of the screw or spiral as the case may be.

According to the invention the measure is taken of fixing the rib to a passage support which is executed in the form of a casting.

In this way the advantage is obtained that a manufacturing process is possible which lends itself well for large-series production of the passage. Moreover, it may often be essenntial to execute the spiral in such a way that the depth of its thread and/or pitch is variable. This means that in most cases a casting process will be used for its production. Another reason for this is that the solid of revolution need not be cylindrical by may have any desired outer contour.

It has been found in practice that the casting, owing to contraction, adheres so firmly to the core that its removal is well-nigh impossible. In order to remedy this drawback the rib is fixed, according to the invention, by means of a contraction joint.

It is expedient for this purpose to form the rib itself also as a casting.

According to a special embodiment an inlet and an outlet channel respectively are provided in the solid of revolution that issues into the spiral passage.

This embodiment provides the possibility of supplying gas to the interior of the solid of revolution or of removing gas from it. In many cases this solid of revolution will be a spindle. The gases can in that case be further conveyed through this spindle, for instance outwards, or to another part of the installation.

The production of the gastight passage is effected as follows:

The passage support is executed as a self-releasing casting, after which the part of it that is intended for the reception of the rib is turned to size to the form of a hollow cylinder by means of a chip-removing operation. The rib is formed on an outer side of a second casting which is likewise self-releasing. The outer side of the latter is now machined to size by a chip-removing operation, to be subsequently fixed by contraction into the said hollow cylinder, after which the part of the second casting which protrudes into the rib is removed by a chip-removing operation.

As the rib is now positioned on the outer side of the second casting, the spiral is at once releasable and can easily be removed from the casting mould.

Figure 2:
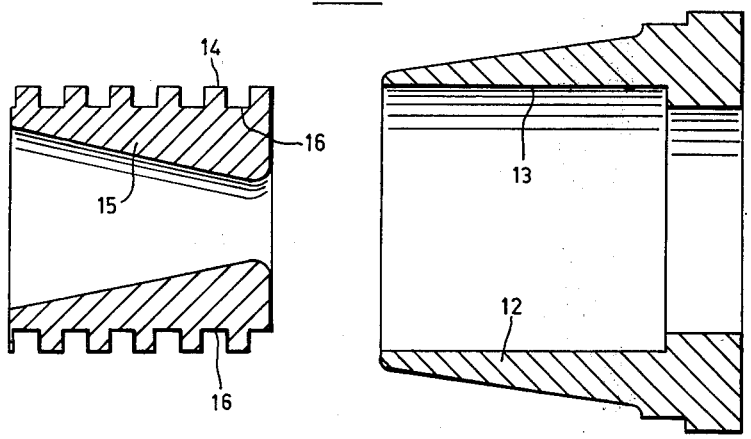
Figure 3:
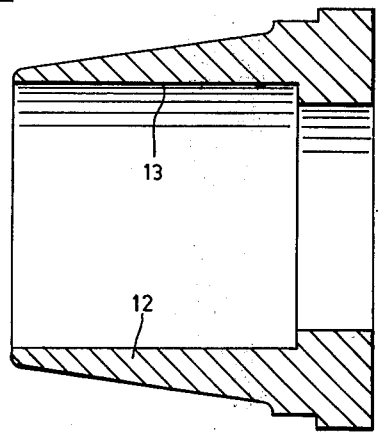
Figure 4:
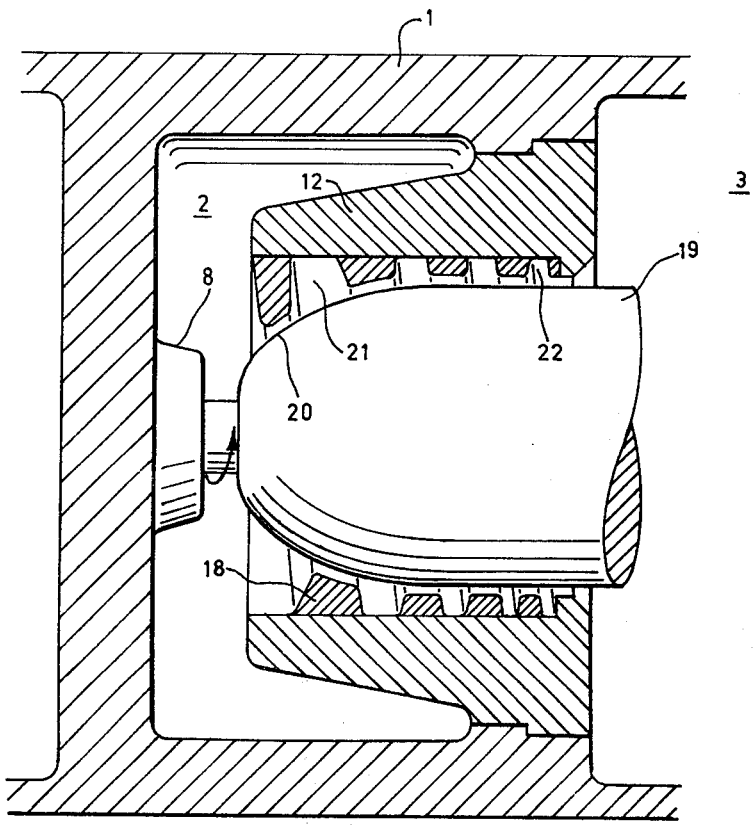

Some embodiments of the invention are further elucidated by reference to the figures described below, in which the following views are given:

FIG. 1 - a vertical cross-section of a gastight passage, the hitherto usual construction is illustrated in the top half, whilst the bottom half represents according to the invention;

FIG. 2 - a vertical cross-section of the second casting before it has been placed in the passage support;

FIG. 3 - a vertical cross-section of a passage support;

FIG. 4 - a variant upon the FIG. 1 embodiment.

In FIG. 1 a space 2 is provided inside a housing 1, from which gases have to be pumped away to space 3. This is effected in that a passage support 4 is provided which has a spiral screw-thread 5. Inside this screw-thread a spindle 6 is provided whose end 7 is pivoted in part 8 which is securely fixed to wall 9 of housing 1.

The working of this installation is as follows:

After the spaces 2 and 3 have been brought to a sufficiently low pre-vacuum and spindle 6 has begun to rotate, the gases are propelled out of space 2 through the spiral passage 5, provided care is taken that the direction of rotation of spindle 6 is such that the entrained current of gas is moved by spindle 5 from space 2 to space 3. The gas currrent in spiral 5 is known as a Knudsen-type current. In a current of this kind, molecules are continually brought into such contact with the moving outer jacket of spindle 6 that they receive a forward impulse in the direction of the spiral passage. The drawing shows at 10 that it is possible to provide spindle 6 with a radial outlet channel communicating with a central outlet channel 11, which may, for instance, likewise issue into space 3. In the bottom part of FIG. 2 the construction is shown which is recommended according to the present invention. In this construction the passage support 12 is first drilled cylindrically so that a smooth inner wall 13 is formed (see also FIG. 3). After this a second casting is made as illustrated in FIG. 2. After the latter has been machined to a precise cylindrical finish on its outer side 14, this second casting is introduced by contraction into the interior of the passage support 12, whereupon a firm connection is etablished in that 12 is heated while the casting 15 may possibly be cooled. After the contraction joint has been established, the portion of part 15 which lies within the diameter 16 is turned away entirely, so that only spiral 17 (see FIG. 1) remains.

FIG. 4 illustrates a somewhat modified embodiment in which a spiral thread 18 is formed in the passage support 12, this sprial thread being so dimensioned that it is suitable for containing a solid of revolution 19 having an outer contour 20 which is curved. In this embodiment the spiral thread at the beginning 21 is much deeper and broader than it is near the end 22. In this way the pumping action of this spiral is greatly intensified.

We claim:

1. In an apparatus having a gastight spiral passage between a rapidly rotating solid of revolution having a curved contour and the inner wall of a stationary housing which surrounds said solid of revolution the improvement which comprises a casting in the form of a tubular support element surrounding said solid of revolution within said housing and sealed to said inner wall of said housing, and at least one continuous casting in the form of a spiral rib having a variable pitch, said spiral rib being shrunk fit within said tubular support element to thereby tightly engage the inner wall of said tubular support element so that said spiral passage is bounded by the sides of said sprial rib, the exposed portions of the inner wall of said tubular support and the adjacent surface of said solid of revolution.

* * * * *